United States Patent [19]

Melamed et al.

[11] Patent Number: 4,519,218
[45] Date of Patent: May 28, 1985

[54] HEATING SYSTEM OPERATING ON STORED ENERGY

[76] Inventors: Avraham Melamed; Zahal Harel, both of 31 Haoranim St., Kfar Shmariyahu 46 910, Israel

[21] Appl. No.: 602,008

[22] Filed: Apr. 19, 1984

[30] Foreign Application Priority Data

May 6, 1983 [IL] Israel ......................................... 68621

[51] Int. Cl.³ ............................................. F25D 23/00
[52] U.S. Cl. ..................................... 62/271; 237/1 R; 165/62; 62/94
[58] Field of Search ................ 62/235.1, 467, 92, 100, 62/106, 94, 95, 271, 269; 165/61, 62; 237/1 R

[56] References Cited

U.S. PATENT DOCUMENTS 4,138,850 2/1979 Tchernev ........................... 62/235.1

Primary Examiner—Henry Bennett
Attorney, Agent, or Firm—Steinberg & Raskin

[57] ABSTRACT

A multi-stage heating system comprising two or more heating stage units. Each unit holds a saturated solution of a hygroscopic solute in contact with solid solute and the units are connected in series in such a way that solution from one unit is fed into an evaporator in the next following unit. In each unit, vapour is brought in contact with the saturated solution to be absorbed by the latter, whereby the solution heats up and the so-heated solution is fed to the evaporator of the next following heating stage. The last heating stage unit is designed for the withdrawal of heat for consumption. If desired, the last unit may also be adapted for cooling. To this end this unit is associated with an external water evaporator which by heat exchange cools the solution inside the last heating stage unit to ambient or slightly above ambient temperature. In this way, intensive evaporation takes place in the evaporator inside the last heating stage unit with the result that the water remaining in the evaporator cools down substantially, e.g. to about 8°–10° C. and can serve for cooling.

Provisions are also made for the regeneration of the saturated solution in each heating stage unit.

12 Claims, 2 Drawing Figures

HEATING SYSTEM OPERATING ON STORED ENERGY

BACKGROUND OF THE INVENTION

The present invention relates to a no-fuel heating system making use of stored energy which may be of natural, e.g. solar or of man-made origin and be available at times when it is not required. Thus, solar insolation in the cold season is quite limited in most climates and accordingly collection of solar energy during the cold season for the production of sensible heat, e.g. for space heating, at that time would by conventional methods require collectors of a very large surface area. It is therefore desirable to store solar energy collected in the summer in large seasonal storage facilities to be used in winter for space heating. A similar problem may be encountered in power production in that available power stations may over-produce in summer so that it may become desirable to store the over-produced excessive energy to be available as sensible heat in winter.

Conventional seasonal heat storage facilities from which sensible heat is to be withdrawn in the winter are not satisfactory in that they have to be quite large and heat losses to the environment are unavoidable.

SUMMARY OF THE INVENTION

It is the object of the present invention to provide a new and improved system by which sensible heat may be stored at the time at which it is available and be released at a time at which it is required.

In accordance with the present invention there is provided a multi-stage heating system comprising:

a first heating stage unit, a last heating stage unit and optionally at least one further heating stage unit between them, each of which units is adapted to hold a saturated solution of a hygroscopic solute in contact with solid solute ("hygroscopic system") and an air space above said hygroscopic system;

means for blowing ambient air through the air space above the saturated solution of the hygroscopic system in said first heating stage unit;

means for transferring heat by means of water as heat carrier fluid from one heating stage unit (an upstream unit) to a heating stage unit next following (a downstream unit) comprising heat exchanger means submerged in the saturated solution within said upstream unit, an evaporator in the air space above said saturated solution in said downstream unit, means for conducting water from said heat exchanger means to said evaporator and means for causing air convection within the air space in said downstream unit;

heat exchanger means in the last heating stage unit which heat exchanger means are linked in a heat carrying manner to at least one heat consumption device;

a source of sensible heat outside said heating stage units; and means for transferring sensible heat from said heat source to the hygroscopic system in each of said heating stage units to cause evaporation of water from the solution thereby to regenerate the hygroscopic system therein.

The saturated solution in each heating stage unit may be in form of an essentially stationary body of solution which may be agitated, or it may be in a state of flow.

A multi-stage heating system according to the invention is made to reciprocate periodically between operational, heat delivery periods and regeneration periods.

During an operational period water vapour is absorbed by the hygroscopic system in each heating stage unit and in consequence of the latent heat of condensation it is transformed into sensible heat. This transformation is due to the capacity of the hygroscopic system to absorb water and in this way previously stored energy is liberated. In consequence of the water absorption some solid solute is dissolved.

During a regeneration period available energy is stored in each of the heating stage units by using sensible heat for the evaporation of water from the solution, thereby restoring the capacity of the hygroscopic system in each unit to absorb water.

In consequence of such regeneration of the hygroscopic system some solid solute precipitates.

There may be cases where the availability of sensible heat and the need for such heat coincides for a while in time. In such cases the first heating stage unit of the system and possibly some further units downstream the first unit may not be required. Consequently, in accordance with one embodiment of the invention means are provided for conducting sensible heat to a heating stage unit downstream the first unit whereby the operation of some of the heating stage units is temporarily obviated and may be interrupted.

While the invention envisages the provision of heating stage systems having a plurality of heating stage units, it has been found that for many purposes such as, for example, space heating, a two-stage system is sufficient. In a two-stage system according to the invention means may be provided for conducting sensible heat directly from said heat source to the second heating stage unit utilizing water as heat carrier fluid, part of which is evaporated in the second stage and reabsorbed by the hygroscopic system therein.

In accordance with one embodiment of the invention the last heating stage unit comprises one single heat exchanger which is used for heat withdrawal during an operational period and for regeneration of the hygroscopic system during a regeneration period.

In accordance with another embodiment the last heating stage unit comprises two separate heat exchangers, one for heat withdrawal during an operational period, and one for the introduction of heat for the regeneration of the hygroscopic system during a regeneration period.

It is preferred that water is used as heat carrier fluid during regeneration. Consequently, the above two-heat exchanger embodiment will be preferred in cases where the heat carrier fluid for the heat withdrawal is non-aqueous. Where, however, the heat carrier fluid in the heat withdrawal system is water the above single-heat exchanger embodiment will be preferred.

If desired, a system according to the invention may also be adapted for cooling, e.g. space cooling in summer time. In such an event said heat consumption device will be so adapted so as to serve also for cooling (radiator) and the system will comprise in addition:

(i) a cooling assembly associated with the second or any further heating stage unit and comprising a heat exchanger submerged inside the solution of that unit, a water evaporation device outside the unit (exterior evaporator) and means for circulating water between said heat exchanger and exterior evaporator thereby to cool the solution inside the unit;

(ii) means for circulating water as a heat carrier fluid between the evaporator located in the air space above the saturated solution in the last heating stage unit (interior evaporator) and said radiator;

(iii) means for supplying make-up water to said interior and exterior evaporators.

Where said cooling assembly is associated with the last heating stage unit no further adaptations are required. Where, however, the cooling assembly is associated with a unit other than the last, it will be necessary to link that unit with the radiators of the last unit by suitable piping. If desired, two or more heating stage units may be adapted for cooling as specified and associated with the radiators of the last unit.

Suitable examples of hygroscopic systems for use in accordance with the invention are saturated aqueous calcium chloride and magnesium chloride solutions in contact with respectively solid calcium chloride and magnesium chloride. A combination of both may also be used, e.g. the so-called Dead Sea End Brine. If desired, different hygroscopic systems may be used in different heating stage units.

BRIEF DESCRIPTION OF THE DRAWINGS

The invention is illustrated by way of example only, in the accompanying drawings in which.

DETAILED DESCRIPTION OF THE PREFERRED EMBODIMENTS

Figure 1:
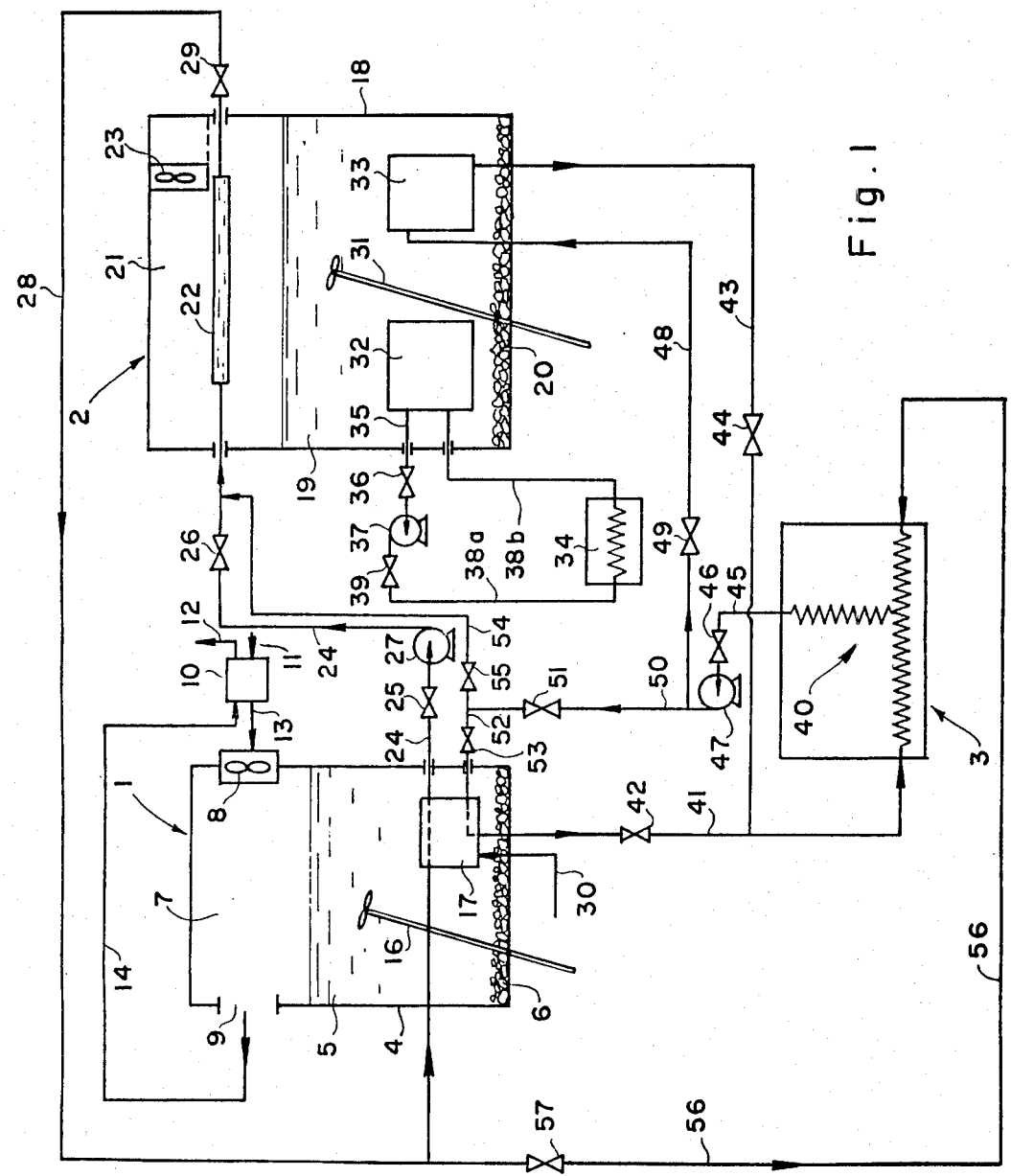
FIG. 1 is a block diagram of a two-stage embodiment of the invention.

The heating system according to the invention here illustrated is a two-stage installation comprising a first heating stage unit 1, a second heating stage unit 2 and a source of sensible heat 3, e.g. a solar heater.

The first unit 1 comprises an insulated vessel 4 adapted to hold a body 5 of a saturated solution of a hygroscopic material in contact with some solid solute 6. Above the body of solution 5 there is an air space 7 fitted on the one side with an aspirator 8 and at the opposite side with an exhaust opening 9. Outside container 1 there is provided a heat exchanger 10 fitted with an intake pipe 11 and an exhaust pipe 12 and connected by means of a duct 13 to aspirator 8. The exhaust opening 9 of vessel 4 is connected by means of an air duct 14 through heat exchanger 10 to exhaust pipe 12. In this way an air flow system is formed which injects ambient air arriving through heat exchanger 10 into space 7 of vessel 4 where it flows in contact with the surface of solution 5 and from where it is ejected via opening 9, duct 14 and heat exchanger 10 in heat exchange with the incoming air.

Submerged inside the body of solution 5 is an agitator 16 and a heat exchanger 17. Heat exchanger 17 forms part of a heat transfer system by which heat is transferred from the first heating stage unit 1 to the second heating stage unit 2 as will be explained further below.

Unit 2 comprises an insulated vessel 18 holding a body 19 of a saturated solution of a hygroscopic material in contact with solid solute 20. Above the surface of solution 19 there is an air space 21 within which are mounted an evaporator in form of a tray 22 and a fan 23.

A pipe 24 fitted with control valves 25, 26 and a pump 27 links heat exchanger 17 of stage 1 with tray 22 of stage 2 and a pipe 28 fitted with a control valve 29 links tray 22 with the intake of heat exchanger 17. In this way a system is formed in which water as heat carrier circulates between heat exchanger 17 and tray 22 transferring heat from the former to the latter, and from tray 22 back to heat exchanger 17. Heat exchanger 17 is fitted with an inlet duct 30 for make-up water.

Submerged in the body of solution 19 in stage 2 are a stirrer 31, a first heat exchanger 32 and a second heat exchanger 33. The first heat exchanger 32 is linked in closed circuit with a heat consuming installation 34, e.g. a system of radiators forming part of a space heating system, the circuit further including a pipe 35 fitted with a control valve 36, a pump 37 and a pipe 38a fitted with a control valve 39, and return pipe 38b. A heat carrier fluid, e.g. water or oil, can circulate between heat exchanger 32 and radiators 34 and in this way sensible heat is withdrawn from the second heating stage unit 2 for consumption.

The sensible heat source 3 which in this case is assumed to be a solar heater comprises a heat exchanger system generally indicated at 40. A pipe 41 fitted with a control valve 42 links the end of heat exchanger 17 of unit 1 with the heat exchanger system 40 of solar heater 3. From pipe 41 there branches off a pipe 43 fitted with a control valve 44 leading to one end of heat exchanger 33. A pipe 45 fitted with a control valve 46 and a pump 47 leads from another end of heat exchanger 40 via pipes 50, 52 and control valves 51, 53 to the other end of heat exchanger 17 and a pipe 48 branching off from pipe 50 and fitted with a control valve 49 leads to the other end of heat exchanger 33. It is thus seen that heat exchangers 17 and 33 are connected in parallel to heat exchanger 40.

Finally, a pipe 56 fitted with a control valve 57 leads into the heat exchanger system 40 of solar heater unit 3.

The operation of the above heating system is as follows:

During an operational period at which sensible heat is delivered to the radiator system 34 valves 25, 26, 29, 36 and 39 are all open while the remaining valves of the system namely 42, 44, 46, 49, 51, 53, 55 and 57 are all shut. Aspirator 8, fan 23, pumps 27 and 37 and agitators 16 and 31 are all switched on. In consequence, the following occurs:

In unit 1 ambient air having a given degree of humidity is aspired via heat exchanger 10 and flows across space 7 of vessel 4 in contact with the body of solution 5. In consequence of this contact humidity is taken up by the solution from the flowing air which results in the transformation of latent heat of condensation into sensible heat. The air flowing across unit 1 is ejected via exhaust opening 9 and flows via duct 14 and heat exchanger 10 in heat exchange with the incoming air and is finally discharged back into the atmosphere via exhaust 12. In this way sensible heat taken up by the through-flowing air from solution 5 is returned to the incoming air in heat exchanger 10.

Water serving as heat carrier circulates through heat exchanger 17, pipe 24, tray 22 and pipe 28. On its way across heat exchanger 17 the circulating water picks up sensible heat from solution 5 and transfers it to tray 22 of stage 2. In tray 22 some of the so pre-heated water evaporates and in consequence of the operation of fan 23 there occurs an air convection which carries the evaporated water in contact with the body of solution 19 which in turn results in the dissolution of some of the solute 20 and the production of more sensible heat. The amounts of evaporated water are made up by make-up water arriving through pipe 30.

Due to the operation of pump 37 heat carrier fluid circulates between heat exchanger 32 and the radiators 34 transferring sensible heat from the former to the latter.

By way of a practical example, upon operational equilibrium the temperature of the solutions in units 1 and 2 is about 20°–25° C. and 40°–45° C. respectively, and the radiators 34 are accordingly maintained at a temperature of about 40° C. which is quite satisfactory for space heating.

During the above operation both the solutions 5 and 19 gradually increase in volume by the uptake of water and the solutes 6 in vessel 4 and 20 in vessel 18 are gradually dissolved. For regeneration valves 25, 26, 29, 36 and 39 are shut, valves 55 and 57 remain shut and valves 42, 44, 46, 49, 51 and 53 are turned open. Moreover, pumps 27 and 37 are switched off and pump 47 is switched on.

Water serving as heat carrier fluid now circulates as follows:

(i) from solar heater 3 via pipes 45, 50 and 52 into heat exchanger 17 and from there back through pipe 41 to solar heater 3;

(ii) from solar heater 3 via pipes 45 and 48 into heat exchanger 33 and from there via pipes 43 and 41 back to solar heater 3.

The so-circulating water carries the heat from solar heater 3 to both heat exchangers 17 and 33 and sensible heat is given off to the solutions 5 and 19 in vessels 4 and 18, respectively, which are thus heated up. The heated up solutions evaporate. In unit 1 the vapour is expelled from vessel 4 via exhaust opening 9 and duct 14 and is discharged through exhaust pipe 12. In unit 2 vapour is expelled from vessel 18 through a window specially provided for the purpose (not shown) and adapted for opening during regeneration. In this way the volumes of solutions 5 and 19 are reduced again and in consequence some of solutes 6 and 20 reprecipitate therefrom until eventually the original states are reached again in both vessels 4 and 18 at which time the hygroscopic systems are fully regenerated. It is thus easily understood that by this process of regeneration of the hygroscopic systems in vessels 4 and 18 the energy available at the time of regeneration from solar heater 3 (or any other seasonable source of sensible heat) is stored in the hygroscopic systems in vessels 4 and 18 and is gradually given off in the form of sensible heat as the solutions 5 and 19 pick up water.

It may occasionally happen that for some reason or other sensible heat is available at source 3 during the period of heat consumption. Thus, for example, where source 3 is a solar heater and heat consumption is by way of space heating, there may be sunny winter days on which the amount of sensible heat produced by the incident sun in heater 3 is equivalent to the heat that would otherwise be generated in the first heater stage unit 1. When this materializes it is useful to utilize the sensible heat generated in unit 3 directly, switching off temporarily unit 1. To this end and referring to the operational period described hereinbefore, valves 25 and 26 are shut and aspirator 8 and pump 27 are switched off while valves 46, 51, 55 and 57 are turned open. Water serving as heat carrier now flows from solar heater 3 via pump 47 and pipes 45, 50 and 54 into tray 22 where some of it is evaporated and the balance is returned via ducts 28 and 56 to solar heater 3 via ducts 28 and 56. This operation is continued for as long as sufficient sensible heat is available at unit 3. When this no longer is the case pump 47 is switched off, valves 46, 51, 55 and 57 are shut, aspirator 8 and pump 27 switched on, valves 25 and 26 are turned open and the unit resumes its normal operation as described hereinbefore.

It should be noted that in this mode of operation make-up water is needed for the solar heater 3 to compensate for the heat carrier water that is evaporated in tray 22.

It is easily understood by those skilled in the art that the manner in which the saturated solution is held inside vessels 4 and 18 may be modified. Thus, the solution in each of heating stage units 1 and 2 may be in a state of flow, e.g. by constantly withdrawing solution from the main body thereof in either of vessels 4 and 18, and spraying it from above to the surface of the body of solution; by providing two vessels in each of units 1 and 2 and continuously circulating the solution between such vessels; and the like, the arrangement always being such that in each heating stage unit said saturated solution is induced to absorb vapour and thereby to heat up.

Figure 2:
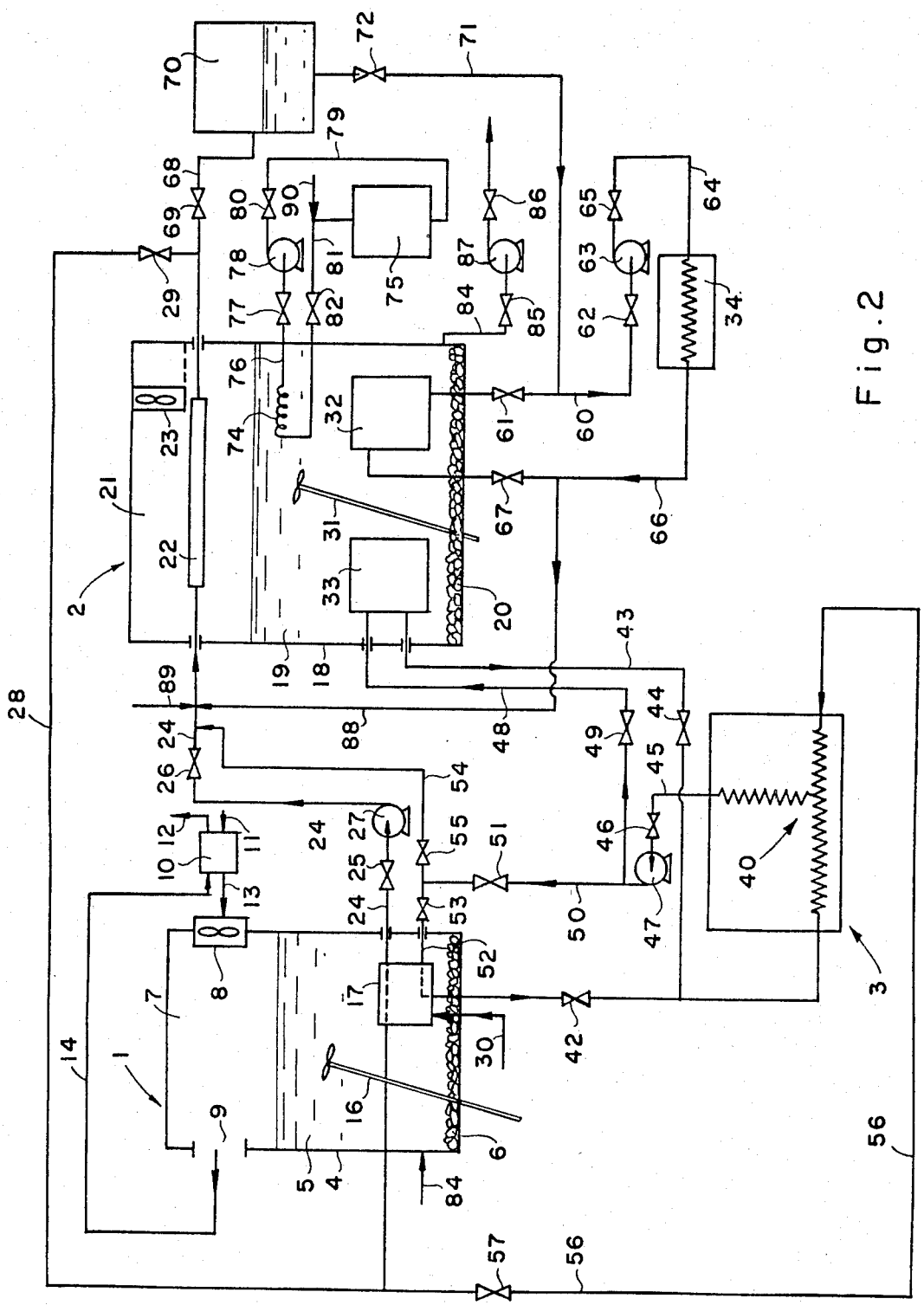
FIG. 2 is a block diagram of another two-stage embodiment adapted also for cooling.

If desired a multi-stage heating system according to the invention may be adapted for space cooling in summer and such a modification is shown in FIG. 2. The system shown in FIG. 2 comprises two heating stages of similar design as in FIG. 1 and equal parts are designated by the same numerals. By referring to FIG. 2 it is seen that unit 1 and the solar heater 3 and parts of unit 2 are the same as in FIG. 1. It should at the same time be noted that in FIG. 2 the positions of heat exchangers 32 and 33 of unit 2 have been reversed which, however, is merely for convenience of illustration. Moreover, in the embodiment of FIG. 2 the heat consumption device 34 is assumed to be in form of radiators adapted to serve for space heating in winter and space cooling in summer. Radiators 34 are linked with heat exchanger 32 by means of a pipe 60 fitted with control valves 61 and 62, a pump 63, a pipe 64 fitted with a control valve 65 and a pipe 66 fitted with a control valve 67.

A pipe 68 fitted with a control valve 69 branching off from pipe 28 leads to an expansion tank 70 which is connected by means of a pipe 71 fitted with a control valve 72 to pipe 60.

Unit 2 is furthermore associated with a cooling system comprising a heat exchanger coil 74 submerged in the upper part of solution 19 and linked by means of pipe 76 fitted with a control valve 77, pump 78, pipe 79 fitted with control valve 80 and pipe 81 fitted with control valve 82 to an external evaporator device 75 in which water is cooled by evaporation, e.g. a cooling tower. The heat carrier fluid in this system is water and a pipe 90 supplies make-up water.

The bottom region of unit 2 is linked with that of unit 1 by means of a pipe 84 fitted with control valves 85, 86 and a pump 87.

A pipe 88 branching off from pipe 66 merges into pipe 24 and also merging into pipe 24 is a pipe 89 serving for the supply of make-up water.

The operation of this system is as follows:

During winter time when it is desired to heat, the operation of the system is identical to that of FIG. 1. In order to inactivate all those accessories which serve for cooling, valves 69, 72, 77, 80, 82, 85 and 86 are all shut and pumps 78 and 87 are inoperative. In that state the system can be used for heating with both units 1 and 2 operative and occasionally with only unit 2 operative, and the solutions 5 and 19 inside vessels 4 and 18 can be regenerated, all as described with reference to FIG. 1.

For using the system in summer time for cooling valves 61, 67, 29, 26, 55, 25, 49, 44 and 57 are all shut while the remaining valves of the system, namely 69, 72, 77, 80, 82, 85, 86, 62, 65, 46, 51, 52 and 42 are all open. Blowers 23 and 8, pumps 78, 87, 63 and 47 and agitators 16 and 31 are all switched on and pump 27 is switched off.

In consequence the following occurs:

Fresh water arriving via pipe 89 is blended with recycled water and conducted to the evaporator tray 22 where it partly evaporates whereby the remaining water cools down. The evaporated water is absorbed by solution 19 and some solute 20 is dissolved, and in consequence of all this the solution would normally heat up. However, in consequence of the constant circulation of water serving as heat carrier fluid between coil 74 and cooling tower 75, the heat carrier water is maintained at about ambient temperature, say about 28° C., and the saturated hygroscopic solution inside the vessel 18 is thereby kept at say about 33° C. At that temperature the partial vapour pressure of the saturated hygroscopic solution is very low and consequently evaporation inside evaporator tray 22 is extensive with the result that the remaining water inside the tray cools down to say about 8° C.

From tray 22 the cold water flows into expansion tank 70 and from there into the radiator system 34 which now serves for space cooling and from where the water is returned via pipes 66, 88 and 24 to tray 22.

In this manner the space is continuously cooled.

During the above operation the saturated hygroscopic salt solution 19 inside vessel 18 increases in volume and the amount of solid solute 22 diminishes. It is therefore necessary to regenerate the solution either continuously or intermittently. To this end solution is withdrawn from the bottom region of vessel 18 via pipe 84, either continuously or intermittently, and is charged into vessel 4 where it is regenerated by means of heat withdrawn from solar heater 3 via heat exchanger 40 which heat is given off to the solution inside vessel 4 by means of heat exchanger 17, as described in detail with reference to FIG. 1. Regenerated solution may be returned from vessel 4 to vessel 18 by reversing the flow in pipe 84.

What we claim is:

1. A multi-stage heating system comprising:
a first upstream heating stage unit and a second downstream heating stage unit, each of said heating stage units being adapted to hold a saturated solution of a hygroscopic system, with an air space being disposed above the hygroscopic system in each unit;
means for blowing ambient air thorugh the air space above the saturated solution of the hygroscopic system in said first heating stage unit;
means for transferring heat by means of water as heat carrier fluid from said first heating stage unit to said second heating stage unit comprising heating exchanger means submerged in the saturated solution within said first unit, an evaporator in the air space above the saturated solution in said second unit, means for conducting water from said heat exchanger means to said evaporator and means for causing air convection within the air space in said second unit;
heat exchanger means disposed in said second heating stage unit and being linked in a heat carrying manner to at least one heat consumption device;
a source of sensible heat outside of said first and second heating stage units; and
means for transferring sensible heat from said heat source to the respective hygroscopic systems in each of said heating stage units to cause evaporation of water from the respective solutions, thereby to regenerate the respective hygroscopic systems therein.

2. A system according to claim 1, additionally comprising means for agitating the respective solutions in each unit.

3. A system according to claim 1 wherein any of said heating stage units is adapted to hold the respective saturated solution in a state of flow.

4. A system according to claim 1, wherein said means for transferring sensible heat comprises means for conducting sensible heat directly to said second heating stage unit.

5. A system according to claim 1, comprising at least one additional heating stage unit between said first and second heating stage units.

6. A system according to claim 1, wherein said second heating stage unit comprises one single heat exchanger which is used for heat withdrawal during an operational period and for regeneration of the hygroscopic system therein during a regeneration period.

7. A system according to claim 1, wherein said second heating stage unit comprises two separate heat exchangers, a first one for heat withdrawal during an operational period, and a second one for the introduction of heat for the regeneration of the hygroscopic system therein during a regeneration period.

8. A system according to claim 1 wherein the hygroscopic system in each heating stage unit is selected from the group consisting of a saturated aqueous calcium chloride solution in contact with solid calcium chloride; a saturated aqueous magnesium chloride; and a mixture of both.

9. A system according to claim 1, wherein different hygroscopic systems are used in different heating stage units.

10. A system according to claim 1, in which said heat consumption device is adapted to serve also as a cooling device, said system additionally comprising:
(i) a cooling assembly associated with at least one of said second heating stage unit and any additional heating stage unit, and comprising a heat exchanger submerged inside the solution within the respective unit, an exterior evaporator located outside the respective unit, and means for circulating water between said heat exchanger and said exterior evaporator thereby to cool the solution inside the respective unit;
(ii) means for circulating water as a heat carrier fluid between an interior evaporator located in the air space above the saturated solution in the respective heating stage unit and said heat consumption device; and
(iii) means for supplying make-up water to said interior and exterior evaporators.

11. A system according to claim 10, wherein said cooling assembly in associated with said second heating stage unit, and said interior evaporator is said evaporator located in the air space above the saturated solution therewithin.

12. A system according to claim 10, wherein at least one additional heating stage unit other than said second unit is associated with said cooling assembly, and piping means are provided for linking said at least one additional unit with said heat consumption device.

* * * * *